(12) United States Patent
Brissette

(10) Patent No.: US 8,230,710 B2
(45) Date of Patent: Jul. 31, 2012

(54) METHOD FOR FORMING A SLIP JOINT ASSEMBLY WITH COATED SPLINES

(75) Inventor: Ronald N. Brissette, Oxford, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 1705 days.

(21) Appl. No.: 11/090,861

(22) Filed: Mar. 25, 2005

(65) Prior Publication Data

US 2006/0213244 A1 Sep. 28, 2006

(51) Int. Cl.
B21B 45/00 (2006.01)
B21D 22/14 (2006.01)

(52) U.S. Cl. .................................. 72/46; 72/83
(58) Field of Classification Search .............. 72/83, 46
See application file for complete search history.

(56) References Cited

U.S. PATENT DOCUMENTS

| | | | |
|---|---|---|---|
| 2,122,537 A * | 7/1938 | Pfeffer, Jr. ................ 413/18 |
| 2,199,926 A | 5/1940 | Swennes | |
| 3,293,884 A | 12/1966 | Grob | |
| 3,367,142 A | 2/1967 | Groves et al. | |
| 4,033,020 A | 7/1977 | Hudgens | |
| 4,115,022 A * | 9/1978 | Orain ................ 403/359.6 |
| 4,125,000 A | 11/1978 | Grob | |
| 4,388,818 A | 6/1983 | Krapfenbauer | |
| 4,552,544 A * | 11/1985 | Beckman et al. ........... 464/162 |
| 4,796,345 A | 1/1989 | Krapfenbauer | |
| 4,872,250 A | 10/1989 | De Marco | |
| RE33,322 E | 9/1990 | Sills et al. | |
| 5,001,916 A | 3/1991 | Schuler et al. | |
| 5,243,874 A | 9/1993 | Wolfe et al. | |
| 5,355,706 A | 10/1994 | Deriaz et al. | |
| 5,471,858 A * | 12/1995 | Deriaz .............. 72/83 |
| 5,720,102 A | 2/1998 | McClanahan | |
| 5,765,419 A | 6/1998 | Krapfenbauer | |
| 5,771,737 A * | 6/1998 | Yaegashi ............ 72/370.19 |
| 5,903,965 A | 5/1999 | Fletcher et al. | |
| 5,919,094 A | 7/1999 | Yaegashi | |
| 5,951,402 A | 9/1999 | Baldwin et al. | |
| 6,279,221 B1 * | 8/2001 | Glowacki et al. ........ 29/527.2 |
| 6,280,339 B1 | 8/2001 | Yaegashi et al. | |
| 6,634,078 B1 | 10/2003 | Breese | |
| 6,754,943 B1 | 6/2004 | Perry et al. | |
| 7,105,472 B2 * | 9/2006 | Zepf ................ 508/128 |

FOREIGN PATENT DOCUMENTS

| | | |
|---|---|---|
| DE | 103 17 506 | 11/2004 |
| EP | 0 707 157 | 4/1996 |
| GB | 2 027 163 | 2/1980 |

OTHER PUBLICATIONS

European Search Report, Appl. No. 06 00 6182, Jul. 25, 2006.

* cited by examiner

*Primary Examiner* — Teresa M Ekiert
(74) *Attorney, Agent, or Firm* — Harness, Dickey & Pierce, P.L.C.

(57) ABSTRACT

A method includes providing a shaft having a coupling section. The coupling section has a generally cylindrical exterior surface. The method includes applying a coating to the coupling section to form an engaging surface. The method further includes cold-forming the shaft and the coating such that a plurality of protrusions is formed in the engaging surface. The cold-forming of the shaft and the coating is performed contemporaneously.

18 Claims, 6 Drawing Sheets

METHOD FOR FORMING A SLIP JOINT ASSEMBLY WITH COATED SPLINES

FIELD OF THE INVENTION

The present invention relates to a slip joint assembly and more particularly to forming of coated splines.

BACKGROUND OF THE INVENTION

A traditional slip joint can connect two members together. In one example, male splines formed on one member can be slipped into female splines formed on the other member. The splines can be formed by myriad processes that can include cold-forming. Various types of cold-forming processes are commonly referred to as Grob cold-rolling processes or Grobing. Briefly, the Grob processes include forming splines, gear teeth etc. on a tube, shaft or rod by, for example, inserting a mandrel into the member and hammer-forming the member against the mandrel to form a spline end. Other Grobing processes can include cold-rolling and vibration forming.

In an unloaded condition, the members of the slip joint can more longitudinally relative to one another. In a loaded condition, the slip joint can be difficult to decouple. In the loaded condition, however, the slip joint can experience wear due to heat generation. In a forging process, a plastic has been applied to each of the spline ends after forming the splines to reduce the wear between the two members. Additional machining or forming after application of the plastic is then required to re-form the splines. In other examples, the plastic can be injected in between the members of the slip joint to reduce play in the slip joint and reduce wear. The additional machining and/or handling of the injection of the plastic can add cost and complexity to slip joint assembly.

SUMMARY OF THE INVENTION

A method includes providing a shaft having a coupling section. The coupling section has a generally cylindrical exterior surface. The method includes applying a coating to the coupling section to form an engaging surface. The method further includes cold-forming the shaft and the coating such that a plurality of protrusions is formed in the engaging surface.

Further areas of applicability of the present invention will become apparent from the detailed description provided hereinafter. It should be understood that the detailed description and specific examples, while indicating the various embodiment of the invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

DETAILED DESCRIPTION OF THE VARIOUS EMBODIMENTS

The following description of the various embodiments is merely exemplary in nature and is in no way intended to limit the invention, its application, or uses.

Figure 1:
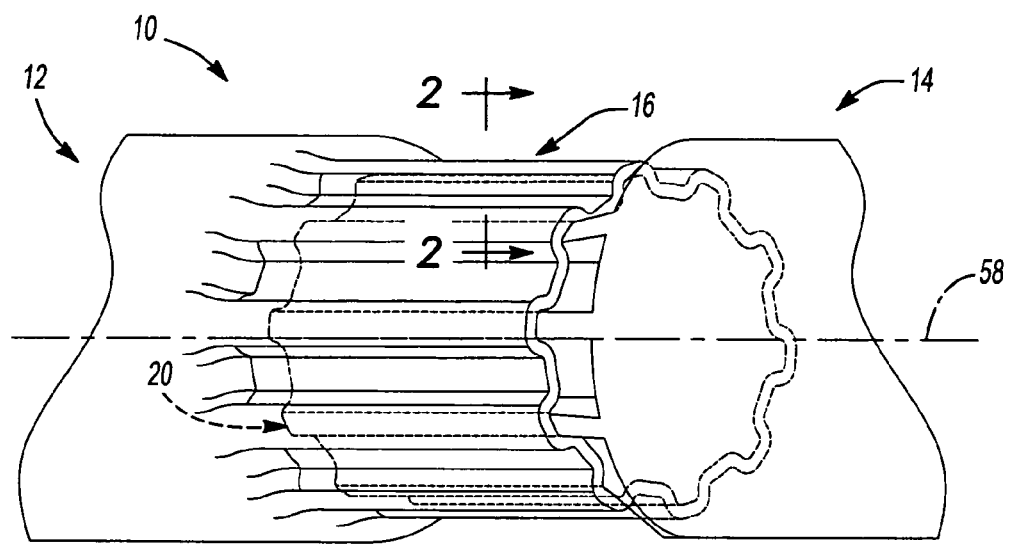
FIG. 1 is a perspective view of a slip joint with a male member having male splines and a female member having female splines with a coating connected to an interior surface of the female member, the slip joint constructed in accordance with the various embodiments of the present invention.
Figure 2:
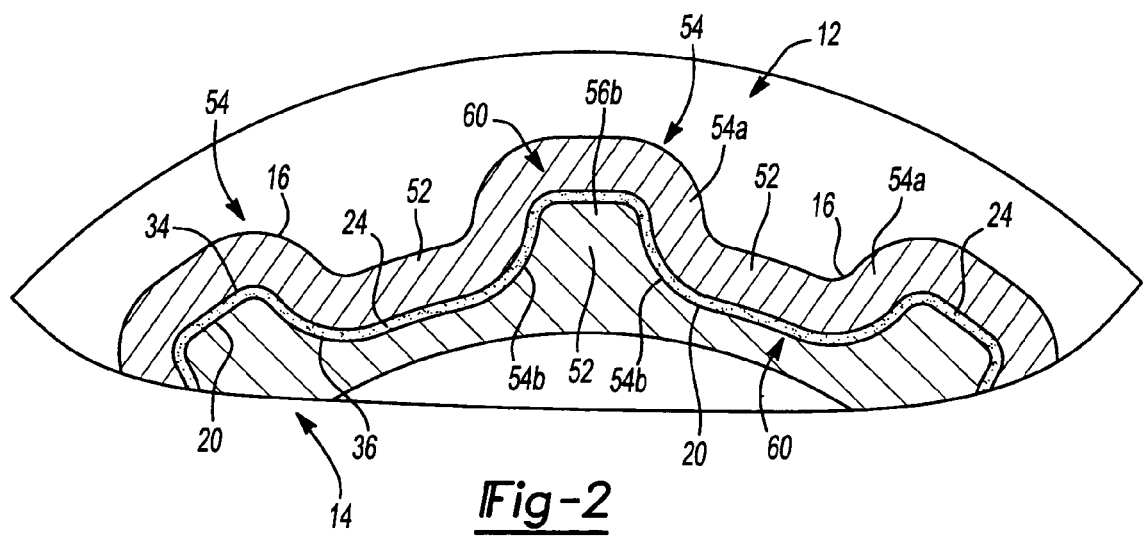
FIG. 2 is a partial cross-sectional view of the slip joint from FIG. 1.
Figure 3A:
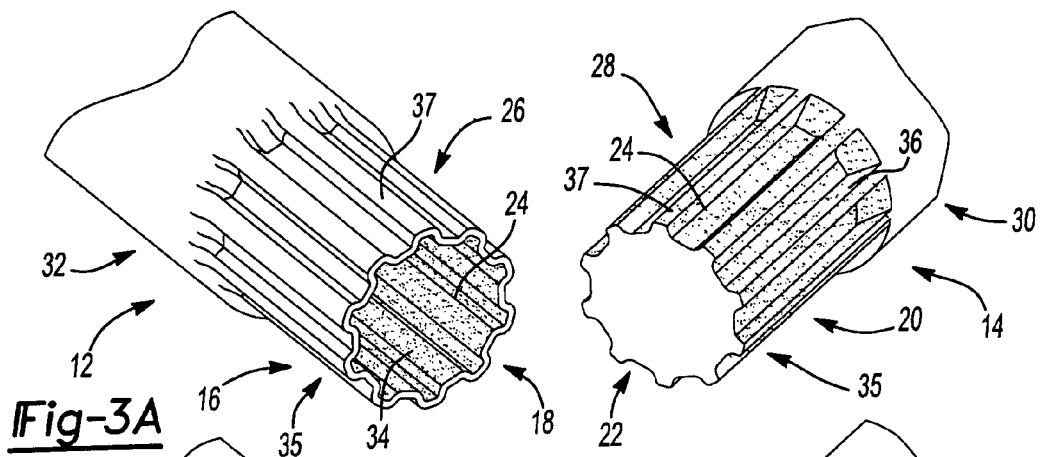
FIGS. 3A, 3B and 3C are perspective views of a plurality of exemplary male and female members with coated splines formed thereon constructed in accordance with the teachings of the present invention.
Figure 3B:
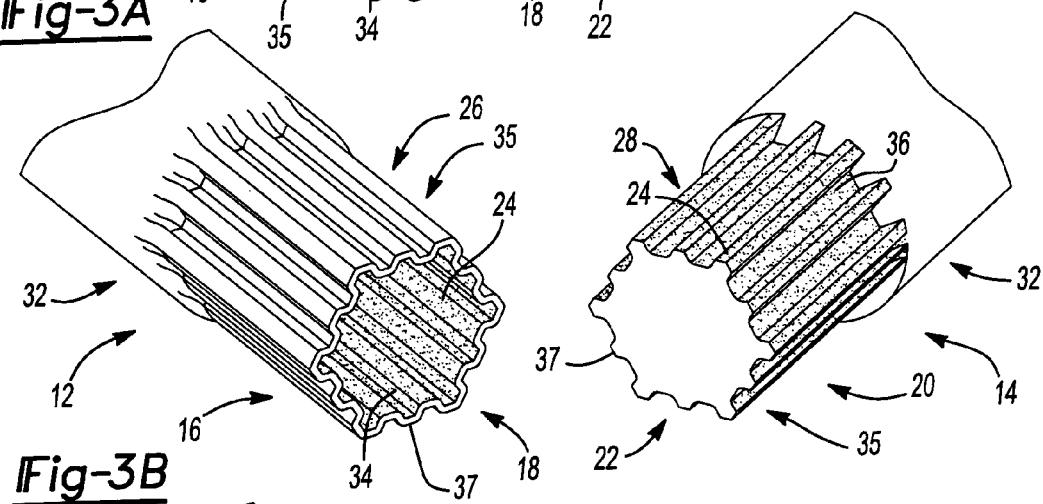
Figure 3C:
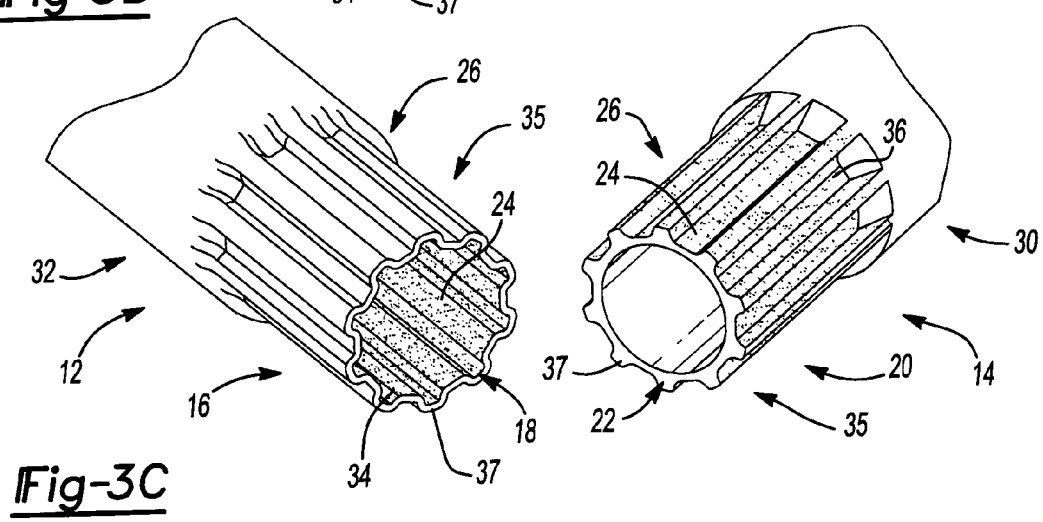

With reference to FIGS. 1 and 2, a slip joint 10 is shown that is constructed in accordance with the teachings of the present invention. The slip joint 10 can include a female member 12 that can be coupled to a male member 14. With reference to FIGS. 3A, 3B and 3C, additional members 12, 14 that can form the slip joint 10 are shown. The female members 12 can have female splines 16 formed on a female end 18 of the female member 12. The male members 14 can have male splines 20 formed on a male end 22 of each of the male members 14. Each of the male ends 22 can be configured to be received by each of the female ends 18 of the female members 12. It will be appreciated that the terms male and female are used only so much as to indicate that one member can be received in the other (i.e., a male member into a female member). Moreover, splines need not be formed on the ends of the members, but may be formed at various locations along the members.

Figure 4:
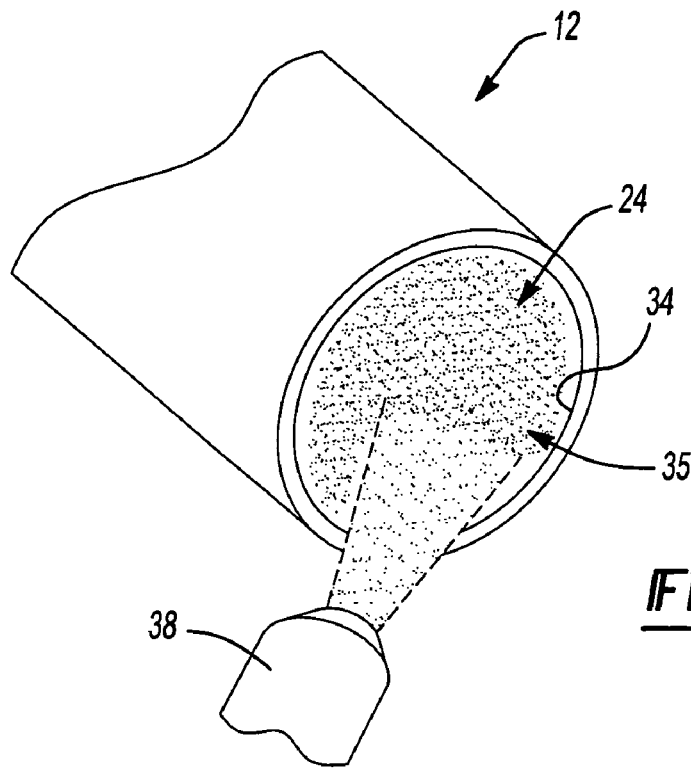
FIGS. 4 and 5 are perspective views of the female member and the male member prior to formation of the respective splines showing application of the coating onto an interior surface of the female member and onto an exterior surface of the male member constructed in accordance with the teachings of the present invention.
Figure 5:
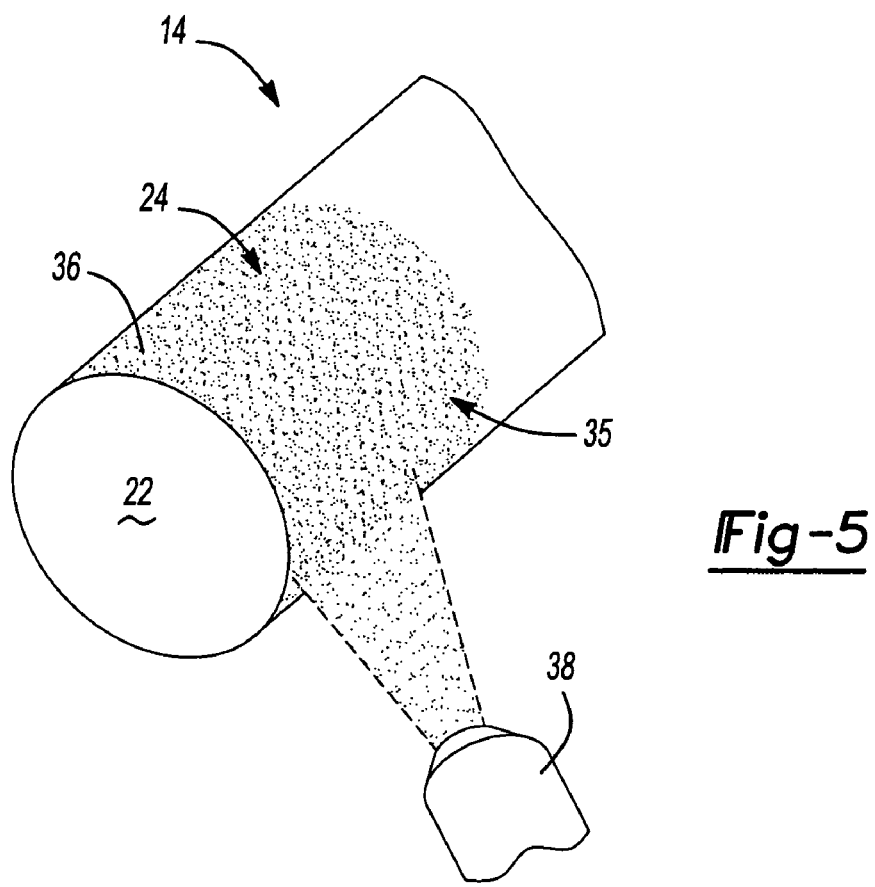

With reference to FIGS. 1, 2, 3A, 3B and 3C, a coating 24 can be connected to the female splines 16 and/or the male splines 20, which is applied prior to formation of the splines 16, 20 as shown in FIGS. 4 and 5. In the various embodiments, the splines 16, 20 can be formed in both the coating 24 and one or more of the members 12, 14 contemporaneously. It will be appreciated that each of the members 12, 14 can either be a tubular member 26, a solid member 28 or combinations thereof. It will further be appreciated that the members 12, 14 can have various cross-sections, for example, a circular cross-section 30 and/or other multi-sided cross-sections 32.

Coupling of the two members 12, 14 together can permit, for example, power to be transmitted from one member to another. For example, opposite ends (not shown) of the members 12, 14 (i.e., opposite the splines 16, 20) can be connected to various components, such as, steering column components of a vehicle (not shown but known in the art).

The coating 24 can include various suitable polymeric plastics, for example but not limited to, plastics comprising a polyamide or so called "Nylon" plastics. By way of example, one suitable plastic is Nylon 11. It will be appreciated that Nylon 11 is produced by polycondensation of the monomer 11-amino-undecanoic acid having a chemical structure as follows: $NH_2CH_2(CH_2)_9COOH$. The coating 14 can be sprayed on an interior surface 34 of the female end 18, an exterior surface 36 of the male end 22 and/or any engaging surface 35 of the member 12, 14. The coating 24 can be applied at a thickness of about 0.003 inches (0.076 millimeters). It will be further appreciated, however, that the thickness of the coating 24 can be specific to a given application and can vary among cold-forming processes used and, as such, can be applied at various thicknesses. Moreover, the thickness need not, but can be, uniform over the respective surfaces 34, 36 of the members 12, 14.

With reference to FIGS. 4 and 5, the coating 24 can be applied to the engaging surface 35 of the female member 12 and/or the male member 14 prior to forming the respective splines 16, 20 (FIG. 3). It will be appreciated that the engaging surface 35 can define any surface upon which a protrusion 37 (e.g., splines 16, 20 (FIG. 3A), teeth 62 (FIGS. 8 and 9) and lobes) can be formed. The coating 14 need not be, but can be, applied to both the female member 12 and the male member 14. The coating 24 can be applied with a suitable applicator 38. The applicator 38 can be, for example, a low-pressure spray applicator. In one embodiment, the coating 24 is applied to the interior surface 34 of the female member 12 prior to formation of the female splines 16. The female splines 16 are then formed contemporaneously from the coating 24 and the female member 12. The female member 12 is then inserted into the male member 14 (i.e., the female splines 16 receive the male splines 20) to form the slip joint 10.

Figure 6A:
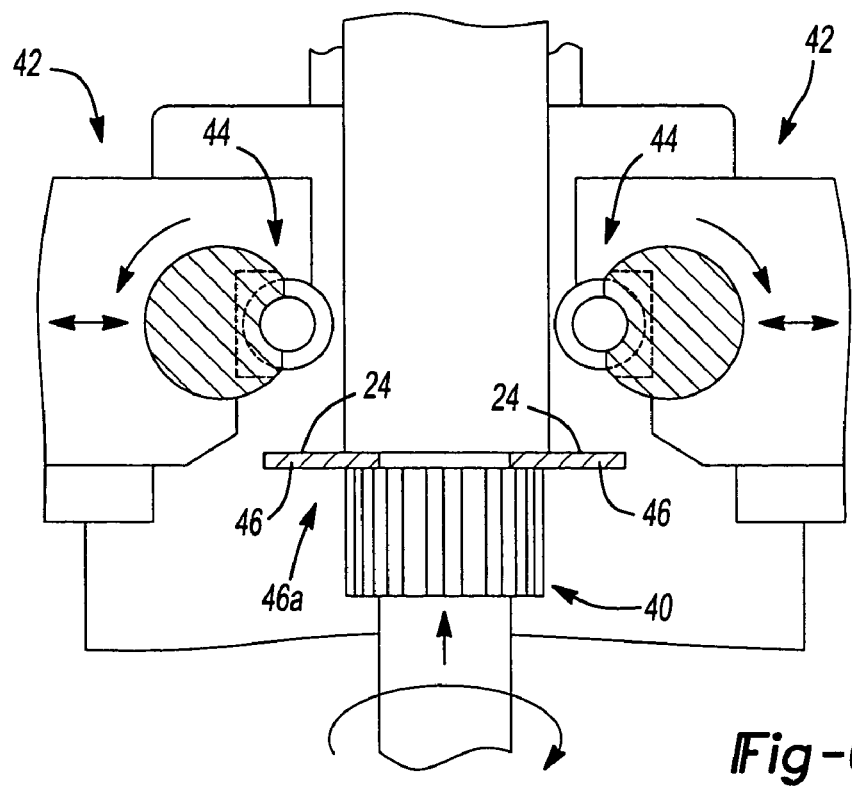
FIG. 6A, 6B, 6C and FIG. 7 are perspective views of exemplary cold-forming process applied to the female and male members of the slip joint constructed in accordance with the teachings of the present invention.
Figure 6B:
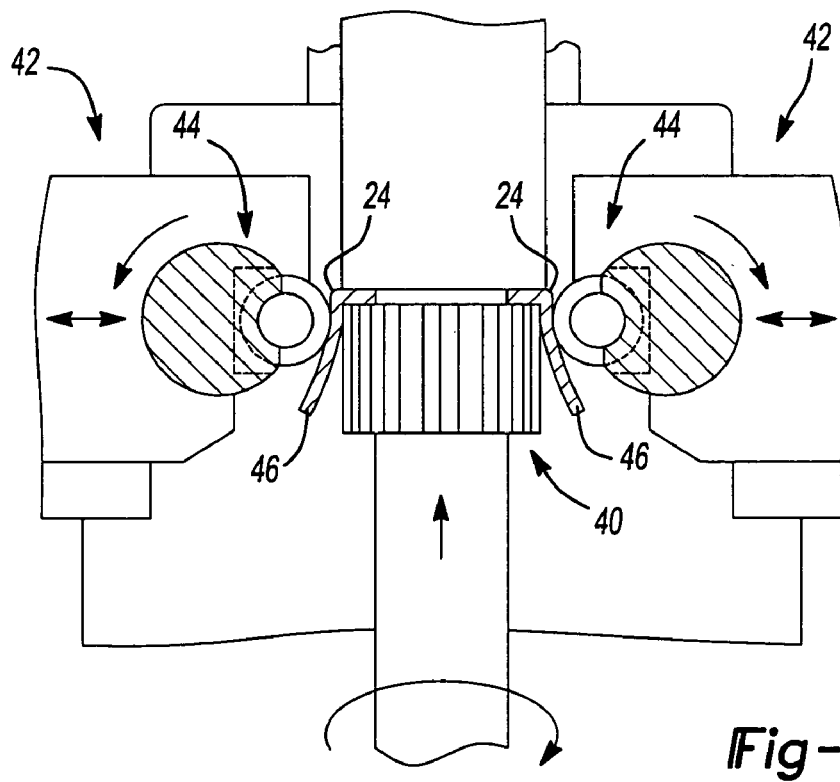
Figure 6C:
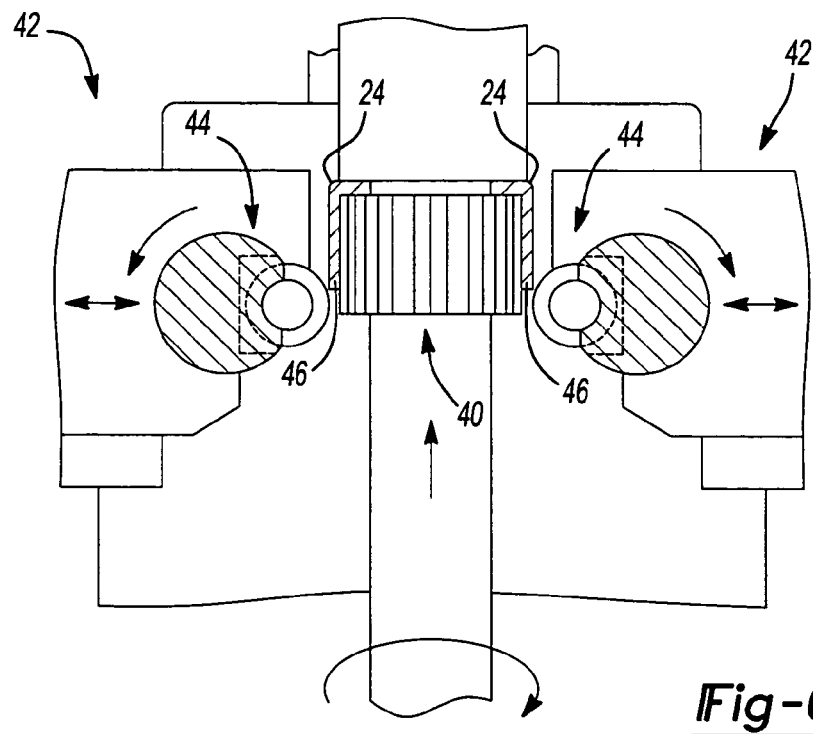
Figure 7:
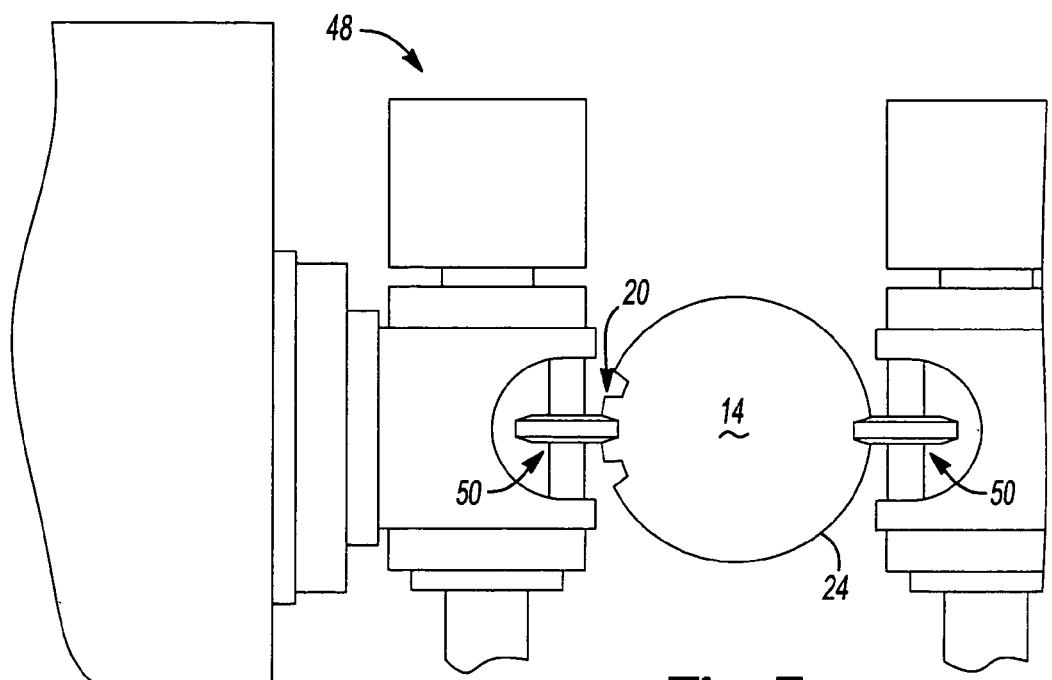

With reference to FIGS. 6 and 7, exemplary cold-forming processes are shown in accordance with the teachings of the present invention. Various suitable cold-forming processes can be commonly and collectively referred to as the Grobing process. The specific details of the various Grobing processes are beyond the scope of present disclosure but are disclosed in greater detail in, for example, U.S. Pat. Nos. 4,388,818 and 5,765,419 to Krapfenbauerand, 5,001,916 to Schuler et al. and 5,355,706 to Deriaz, et al., all assigned to Ernst Grob AG, Mannedorf, Switzerland, which are hereby incorporated by reference as if fully set forth herein.

Briefly and with reference to FIGS. 6A, 6B and 6C, one embodiment of the present invention can include abutting a mandrel 40 against the female member 12 with the coating 24 already applied thereto as above-described. A forming-roller 42 with a suitable forming-wheel 44 can be driven against an exterior surface 46 of the female member 12, as shown in FIG. 6B. By way of example, a portion 46a of the exterior surface 46 can be upturned (i.e., about normal to the female member 12) such that the exemplary Grobing process can press the portion 46a of the exterior surface 46 against the mandrel 40. By driving the forming-roller 42 against the portion 46a of the exterior surface 46 of the female member 12, the female splines 16 with the coating 24 may be formed against the mandrel 40, as shown in FIG. 6C. It will be appreciated that the splines 16 are contemporaneously formed from the exterior surface 46 and the coating 24. It will also be appreciated that the above-mentioned process can be equally applicable to form male splines 40 on male members 14 that are at least partially tubular 26 in construction as illustrated in FIG. 3C.

With reference to FIG. 7, one embodiment of the present invention can include forming the male splines 20 in both the coating 24 and the male member 14. A forming tool 48 can have a suitable roller heads 50 that can be rolled over the coating 24 on the exterior surface 36 of the male member 14. The roller head 50 can apply sufficient pressure to form the male splines 20 on the male end 22 in both the male member 14 and the coating 24 contemporaneously.

It will be appreciated that various tooling (e.g., the mandrel 40 (FIGS. 6A, 6B and 6C), the forming-roller 42 and the forming tool 48) that can be used for the formation of a slip joint absent the coating 24 can be reused with little to no modification when forming the splines 16, 20 in both the coating 24 and the members 12, 14 contemporaneously. More specifically, the tooling produced to form the slip joint absent the coating 24 can be reused because the final dimensions of the slip joint 10 with the coating 24 already applied remain the same as if the coating 24 was not used. It will be appreciated that minor modifications to the tooling can include, for example, reduction of sharp angles to reduce shear stresses experienced by the coating 24 during the forming process.

With reference to FIG. 2, the slip joint 10 is shown with the coating 24 in between the male and female splines 16, 20. It will be appreciated that the coating 24 can be connected to either the female member 12, the male member 14 and/or combinations thereof. The female and male splines 16, 20 include a plurality of teeth 52 that are circumferentially spaced from one another. Each tooth 52 includes a pair of legs 54 extending radially from a tooth face 56. By way of example, the female member 12 includes the pair of legs 54a that extend from the tooth face 56a radially outward from a longitudinal axis 58 of the slip joint 10 (FIG. 1). By way of the above example, the male member 14 includes the pair of legs 54b that extend from the tooth face 56b radially inward toward the longitudinal axis 58 of the slip joint 10. Each tooth 52 can be the individual splines of the spline shaft, which forms the members 12, 14 of the slip joint 10. As such, the legs 54a or 54b of two adjacent teeth 52 form a hollow 60 that can receive the tooth 52 of the opposite member (e.g., the hollow 60 on the male member 14 can receive the tooth 52 on the female member 12).

The legs 54a, 54b of the teeth 52 on each member 12, 14 abut each other to drivingly engage the female and male members 12, 14. Moreover, the male member 14 can slide within the female member 12, when not under load, to permit relative longitudinal movement between the two members 12, 14. The sliding movement can be utilized for assembly and disassembly of the slip joint 10. In addition, the sliding movement can accommodate motion of the members 12, 14 relative to one another.

Wearing of the slip joint 10 and/or gear teeth 62 due to, for example, heat production from loading of the members can be reduced because the coating 24 can serve as an interface. Moreover, machine processes to re-shape a coating applied after cold-forming the splines or gear teeth is no longer required as the splines or gear teeth are formed in both the coating and the members contemporaneously during the various cold-forming process. More specifically, post-process machining such as milling or burring of the coating is no longer required to re-form the spline or gear tooth shape in the coating.

Figure 8:
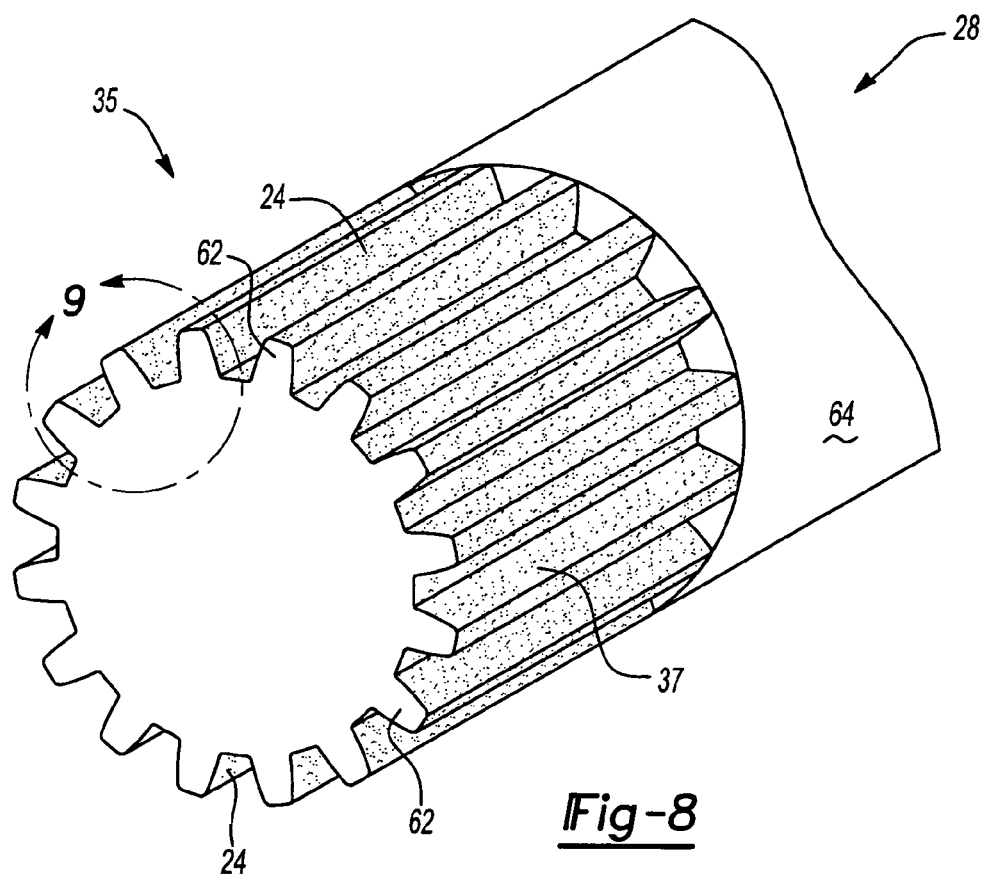
FIG. 8 is a perspective view of a member with a coated spur gear formed thereon constructed in accordance with the teachings of the present invention.
Figure 9:
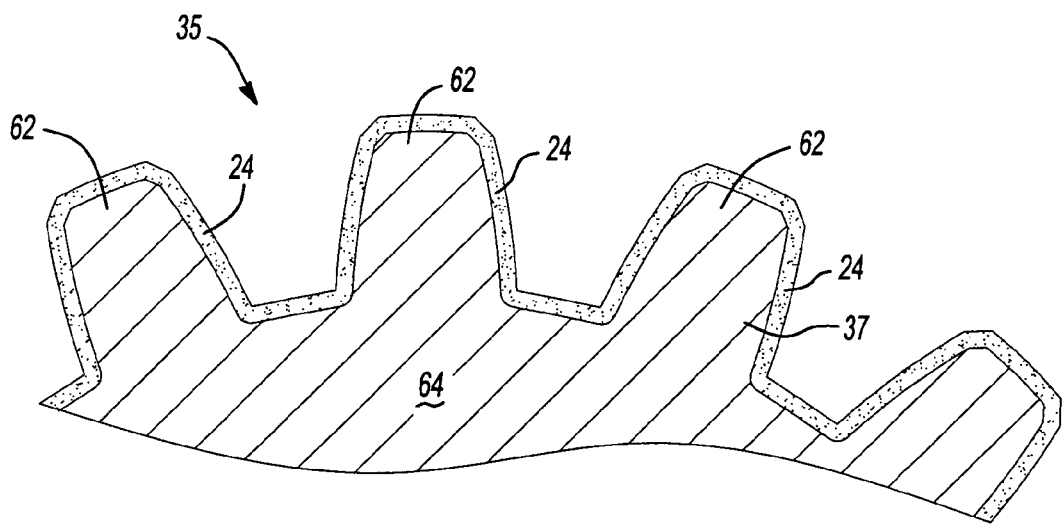
FIG. 9 is a partial cross-sectional view of coated teeth of the spur gear of FIG. 8.

With reference to FIGS. 8 and 9, one embodiment of the present invention can include gear teeth 62 formed out the coating 24 and a member 64. The gear teeth 62 can have various forms such as spur, hypoid, helical or other suitable shape as known in the art. Moreover, the gear teeth 62 can be formed on the member 64, which is either tubular 26, solid 28 or combinations thereof. It will be appreciated that the gear teeth 62 are formed in both the member 64 and the coating 24 contemporaneously. Moreover, similar cold-forming processes (e.g., process illustrated in FIGS. 6 and 7) can be used to form the gear teeth 62 in both the coating 24 and the member 64 contemporaneously.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method comprising:
    providing a shaft having a coupling section, said coupling section having a generally cylindrical exterior surface;
    applying a polyamide coating to the coupling section to form an engaging surface; and
    cold-forming said shaft and said polyamide coating such that a plurality of protrusions is formed in said engaging surface.

2. The method of claim 1 wherein applying said polyamide coating to said coupling section includes spraying said coating onto said coupling section.

3. The method of claim 1 wherein said polyamide coating is a nylon coating.

4. The method of claim 1 wherein said engaging surface is disposed radially outward of said exterior surface of said coupling section.

5. The method of claim 4 further comprising:
    providing a coupling with a mating coupling section, said mating coupling section including a plurality of mating protrusions; and
    inserting the coupling section into the mating coupling section such that said protrusions of said coupling section matingly engage said mating protrusions.

6. The method of claim 1 wherein said protrusions are selected from a group consisting of teeth, splines and lobes.

7. The method of claim 1, wherein said coupling section is hollow and wherein cold-forming said coupling section includes:
    inserting a male mandrel into said coupling section; and
    deforming said coupling section radially inward against said male mandrel.

8. The method of claim 7, further comprising:
    providing a shaft with a mating coupling section; and
    inserting said mating coupling section into said coupling section to form a slip joint.

9. The method of claim 1, wherein cold-forming said coupling section comprises a cold-rolling operation.

10. A method comprising:
    providing a shaft having a coupling section, said coupling section being generally circular or annular in cross-section;
    applying a polyamide coating to an exterior surface of said coupling section; and
    cold-rolling said coupling section to form a plurality of protrusions, each of said protrusions being formed by a portion of said shaft and having an outer layer formed of said polyamide coating.

11. The method of claim 10, wherein applying said polyamide coating to said exterior surface of said coupling section includes spraying the said polyamide coating onto said exterior surface.

12. The method of claim 11, wherein said coupling section is hollow and wherein cold-forming said coupling section includes:
    inserting a male mandrel into said coupling section; and
    deforming said coupling section radially inward against said male mandrel.

13. The method of claim 10, wherein said polyamide coating is a nylon coating.

14. The method of claim 10, wherein said exterior surface defines an inside diameter of said coupling section.

15. The method of claim 14, further comprising:
    providing a coupling with a mating coupling section, said mating coupling section including a plurality of mating protrusions; and
    inserting said coupling section into the mating coupling section such that said protrusions of said coupling section matingly engage said mating protrusions.

16. The method of claim 10, wherein said protrusions are selected from a group consisting of teeth, splines and lobes.

17. The method of claim 10, further comprising:
    providing a shaft with a mating coupling section, said mating coupling section including a plurality of mating protrusions; and
    inserting said mating coupling section into said coupling section such that the protrusions of said coupling section matingly engage said mating protrusions.

18. A method comprising:
    providing a member;
    coating said member with a nylon; and
    cold-forming protrusions from said member and said coating wherein sad protrusions are configured to transmit rotary power therethrough.

* * * * *